(12) United States Patent
Tosey et al.

(10) Patent No.: US 6,392,990 B1
(45) Date of Patent: May 21, 2002

(54) METHOD FOR IMPLEMENTING INTERFACE REDUNDANCY IN A COMPUTER NETWORK

(75) Inventors: Joseph P. R. Tosey; Andries Loubser; André Viljoen, all of North Vancouver (CA)

(73) Assignee: Glenayre Electronics, Inc., Charlotte, NC (US)

( * ) Notice: Subject to any disclaimer, the term of this patent is extended or adjusted under 35 U.S.C. 154(b) by 0 days.

(21) Appl. No.: 09/360,236

(22) Filed: Jul. 23, 1999

(51) Int. Cl.[7] .................................................. H04J 1/16
(52) U.S. Cl. ...................................... 370/218; 370/245
(58) Field of Search ................................. 370/216, 217, 370/242, 247, 248, 256, 465, 466, 250, 243, 241, 218, 219, 226, 246, 245, 252, 400, 220; 714/25, 39, 48

(56) References Cited

U.S. PATENT DOCUMENTS

| | | |
|---|---|---|
| 4,500,985 A | 2/1985 | Chang |
| 4,575,842 A | 3/1986 | Katz et al. |
| 4,825,206 A | 4/1989 | Brice, Jr. et al. |
| 5,134,704 A | 7/1992 | Leuty |
| 5,218,604 A | 6/1993 | Sosnosky |
| 5,260,945 A | 11/1993 | Rodeheffer |
| 5,287,491 A | 2/1994 | Hsu |
| 5,390,326 A | 2/1995 | Shah |
| 5,432,907 A | 7/1995 | Picazo, Jr. et al. |
| 5,522,046 A | 5/1996 | McMillen et al. |
| 5,537,642 A | 7/1996 | Glowny et al. |
| 5,604,862 A | 2/1997 | Midgely et al. |
| 5,608,865 A | 3/1997 | Midgely et al. |
| 5,708,654 A * | 1/1998 | Arndt et al. ................. 370/242 |
| 5,737,316 A * | 4/1998 | Lee ............................ 370/248 |
| 5,815,668 A * | 9/1998 | Hashimoto .................. 370/217 |
| 6,032,194 A | 2/2000 | Gai et al. |
| 6,108,300 A * | 8/2000 | Coile et al. ................. 370/222 |

FOREIGN PATENT DOCUMENTS

WO    PCT/US00/18521    1/2001

* cited by examiner

*Primary Examiner*—Melvin Marcelo
*Assistant Examiner*—Chiho Andrew Lee
(74) *Attorney, Agent, or Firm*—Christensen O'Connor; Johnson Kindness PLLC

(57) ABSTRACT

A method and system for recovering transparently from a network interface failure. The method is to be run in a computing device on a network with multiple peer computing devices, having redundant network interfaces connected with redundant cables. The method transparently recovers from network failures by first establishing an address list of the peer computing devices on the subnet. The computing device then periodically tests the communication link with one or more of the peer computing devices until at least one peer device responds thereby sending its network address. The computing device then uses the peer network address to retest the communication link with the peer device until the peer device does not respond. If there is no response, the computing device reassigns the network address of the computing device from the primary network interface to the redundant network interface. This substantially reduces or eliminates disruptions in network connections established by computer applications or other higher layer connections.

13 Claims, 11 Drawing Sheets

METHOD FOR IMPLEMENTING INTERFACE REDUNDANCY IN A COMPUTER NETWORK

FIELD OF THE INVENTION

This invention relates in general to computer networks, and in particular, to a method and system for implementing network redundancy in a paging network.

BACKGROUND OF THE INVENTION

Communication networks are well-known in the computer communications field. By definition, a network is a group of computers and associated devices that are connected by communications facilities or links. Networks may vary in size, from a local area network (LAN) consisting of a few computers or workstations and related devices, to a wide area network (WAN) which interconnects computers and LANs that are geographically dispersed. A LAN is sometimes defined as a subnet. Where a subnet is a portion of a network that may be a physically independent network segment, which shares a network address with other portions of the network and is distinguished by a subnet address.

An internetwork, in turn, is the joining of multiple LANs or subnets, both similar and dissimilar, by means of gateways or routers that facilitate data transfer and conversion from various networks. A representative section of a network 10 is shown in FIG. 1 (Prior Art) in which a plurality of LANs 11 and a WAN 12 are interconnected by routers 13. The routers 13 are generally known as special purpose computers used to interface one LAN or WAN to another.

Typical communication networks also have a common network architecture based upon the Open Systems Interconnection (OSI) Reference Model in order to provide communication between a multiplicity of interconnected computing devices or "nodes." The OSI Reference Model segments networking protocols into seven layers, which are listed, in ascending order of abstraction as: (1) the physical layer, (2) the data link layer, (3) the network layer, (4) the transport layer, (5) the session layer, (6) the presentation layer, and (7) the application layer.

Internetworking devices such as repeaters, bridges, and routers operate at a different layer of the OSI Reference Model. Repeaters, also known as "concentrators" and "hubs," operate at the physical layer, which provides the electrical and mechanical interface to the physical medium of the network. All network computing devices, such as personal computers and workstations, also include network interface cards (NICs) to connect the computing device to the network at the physical layer. Finally, routers operate at the network layer, which initiates and terminates network connections and manages routing, data sequencing, and error detection and recovery. At the application layer, common computer programs, such as FTP and Telnet, control the session layer and sometimes control the transport layer.

As shown in FIG. 1, routers 13 are used to connect LANs 11 and WANs 12. The main purpose of a router 13 is to allow transparent data communications between computers that reside on separate LANs. At the network level of the OSI model, routers 13 use the IP address in data packets to actually determine the path of the packet from node to node until it reaches the destination node. Along with making this complex decision regarding the packet transmission, they also actively exchange information regarding the overall network topology and adjust those decisions in response to network traffic and even outages within the LAN. Routers also make limited decisions regarding the physical location of the packet's destination node.

Routers basically have three main functions: learning routes, selecting routes, and maintaining routes. A router learns the routes by creating a routing table by searching for the network address of each network device on a network. The router then selects the routes for the data packets sent through the router by searching for the shortest path between a destination node and a source node. The router also maintains a record of the best routes by listening for IP address changes requests from network devices and updating their routing tables as necessary. The time it takes for all routing tables to update their routing tables is called convergence. In most large networks, the convergence time takes more than several minutes and the updates are sometime in a random order. Routers use Interior Gateway Protocols (IGPs) to update the routing tables. As known in the art, these include protocols such as: Routing Information Protocol (RIP or a newer version, RIPv2), Open Shortest Path First (OSPF), or Extended Interior Gateway Routing Protocol (EIGRP).

Each network node contains a MAC address and an IP address. MAC addresses are unique hardware addresses that are commonly stored in the ROM of every network device. These addresses are assigned according to the manufacturer in the manner of a serial number. The Media Access Control (MAC), or MAC addresses governs the physical layer of a network. IP addresses, on the other hand, are designed to be changed dynamically. IP addresses are often assigned when a network computing device is booted up on the LAN and an IP address is often allocated to the actual computing device by a dynamic host configuration protocol (DHCP) server or a boot protocol (BOOTP) server. The Network Layer routes data packets between a source and destination device by adding an IP address header to each packet transferred over the network. To preserve a reliable data channel between all nodes of a network, each network computing device must maintain unique MAC and IP addresses for each node. This list of MAC and IP addresses is sometimes referred to as an ARP cache or routing table of a computing device. The Address Resolution Protocol (ARP) is used to identify the MAC address associated with an IP address that resides on the same subnet. This is a commonly used protocol to update the ARP cache or routing table of a computing device. With the use of this network architecture, each computer and/or electronic device that is connected to the network 10 is capable of communicating with any other electronic device or computer connected to the network 10.

From time to time, a physical interface, such as a transceiver, cable hub port, hub, router port, network interface card, in a computer network fails. Typically, the failure of a network interface is only detected when other network computing devices attempt to communicate through the interface and the interface fails to respond. The network computing devices may attempt to retry communications through the interface before disconnecting. However, in most cases, recovery from the network interface failure is only achieved by subsequently establishing a network connection though an alternative interface after a network failure. When this happens, most transport connections, session connections, and application associations are lost. In this type of failure, the programs at the application layer are interrupted and in some cases external alarms may be generated. The amount of time and effort it takes for the network resources to accomplish the recovery can significantly interfere with the ongoing operation of the network devices.

Also, typical mechanisms currently used to test network failures include some form of link test, which normally operate at the media access, or physical layer. There are two main difficulties with this technique. First, failures of higher layers in active components such as ethernet switches or routers are not detected. It may be possible to contact the hub at the ethernet level, but not contact any network computing devices through the IP address because of an invalid routing table. Second, network failure detection is hardware, protocol, and media specific. This requires a new procedure, not only for each type of media, e.g. 10 Mbps or 100 Mbps ethernets, but also for each interface chip used, e.g. Intel 82596 or 68360EN, etc.

It is therefore desirable to have a network architecture and method that allows for transparent recovery from failures in the network. A transparent recovery is one in which network resources generally do not realize that a network interface has failed or is not available, thus maintaining most transport connections, session connections, and application associations.

SUMMARY OF THE INVENTION

The invention provides a method and a system for implementing interface redundancy in a computer network so that communication between computing devices connected to the network is always available, despite periods in which a particular network interface has failed or is otherwise removed from network operation. That is, when a network interface is unavailable, the network automatically compensates and routes communications through an alternative interface already established. The invention is accomplished by providing a redundant network architecture with mechanisms for automatically detecting and recovering from failure of a network interface. The present invention also allows the network to continue operation without the need for recovery actions, such as the replacing the failed network interface card.

According to the invention, each network computing device periodically searches out and performs link tests with other devices using one or more of the described techniques. In order to optimize the use of limited bandwidth in network communication, the following algorithm may be implemented. First, a network device periodically sends out a broadcast "ping" message until at least one peer device responds. Upon receiving a response, the interface is assumed to be operational. The network computing device then retains the address of the device that responded. The computing device then periodically pings that particular address until it does not respond. If circumstances arise in which there is a failure to respond to a ping, the network computing device goes back to broadcasting a ping message as described above. If no device responds, the network interface is assumed to have failed. This algorithm may be used to test all network interfaces associated with a specific network computing device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

This invention covers a method for implementing network redundancy in a computer network. The method provides continuous availability of a network interface card by detecting a network failure and compensating for the failure before most network resources lose their network connections. The present invention also detects the failure of other network connecting components. For the purposes of this disclosure, a network connecting component includes the components connected to the network interface card, such as the hub, cables, a router port and other like items. Also, the term, network computing device, is defined to include personal computers, workstations, routers and any other like devices with a central processing unit.

Figure 1:
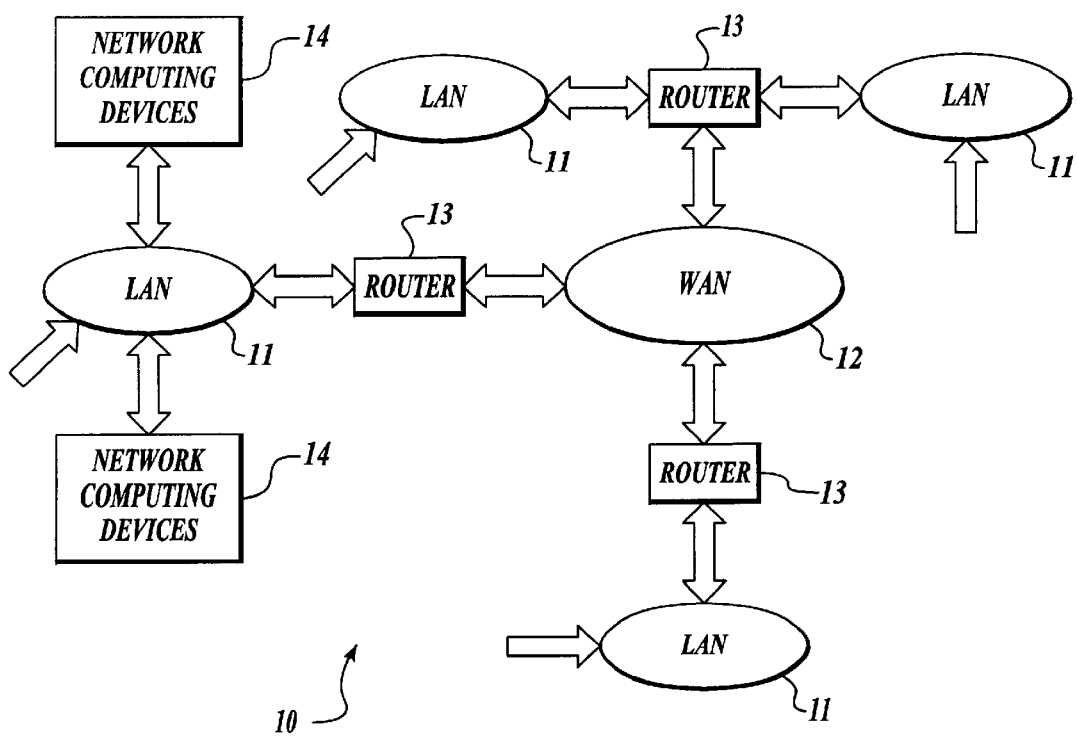
FIG. 1 (Prior Art) is an illustration of a representative section of a large network.
Figure 2:
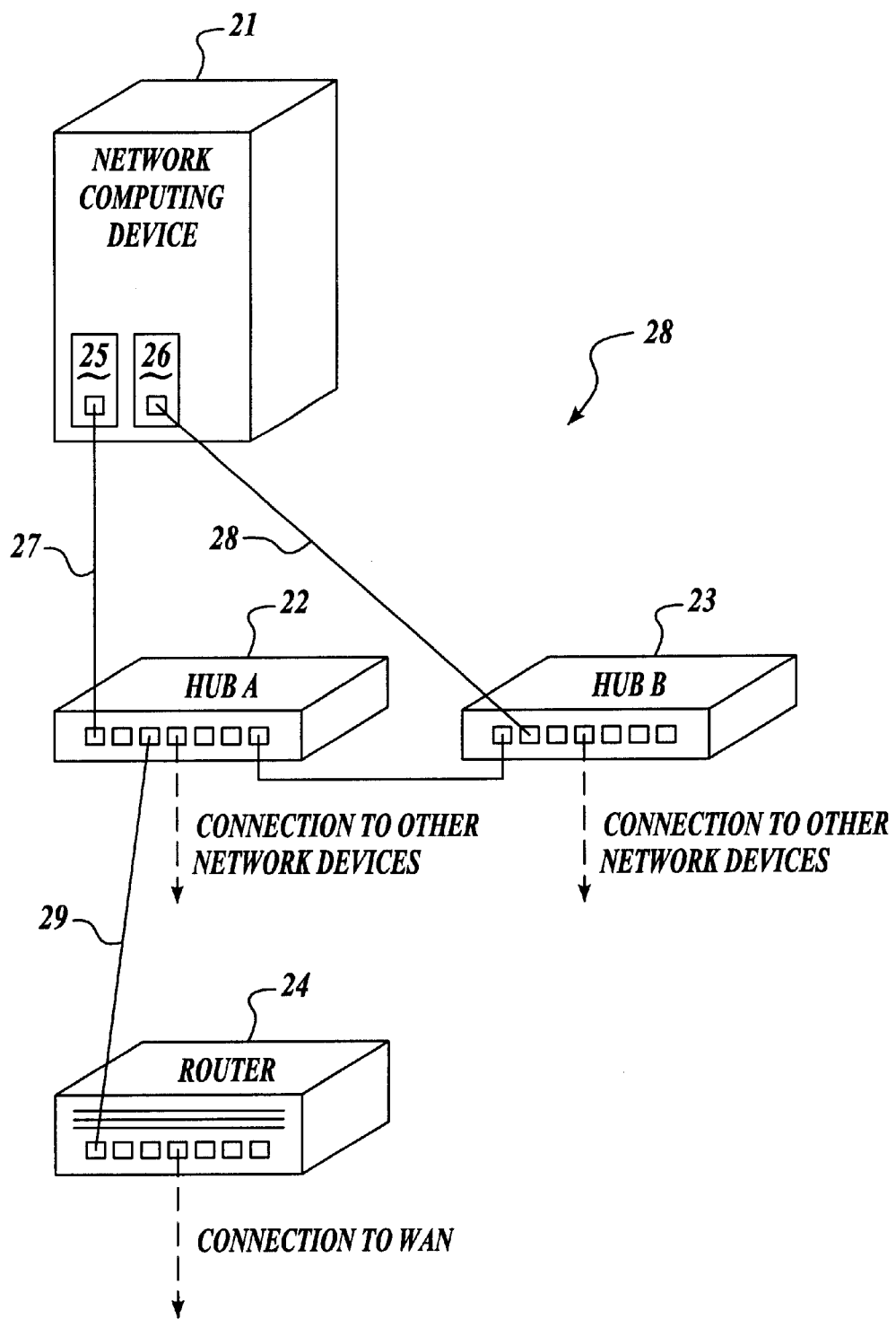
FIG. 2 is an illustration of a network system in which there is a redundant network but no redundant computing devices.
Figure 3:
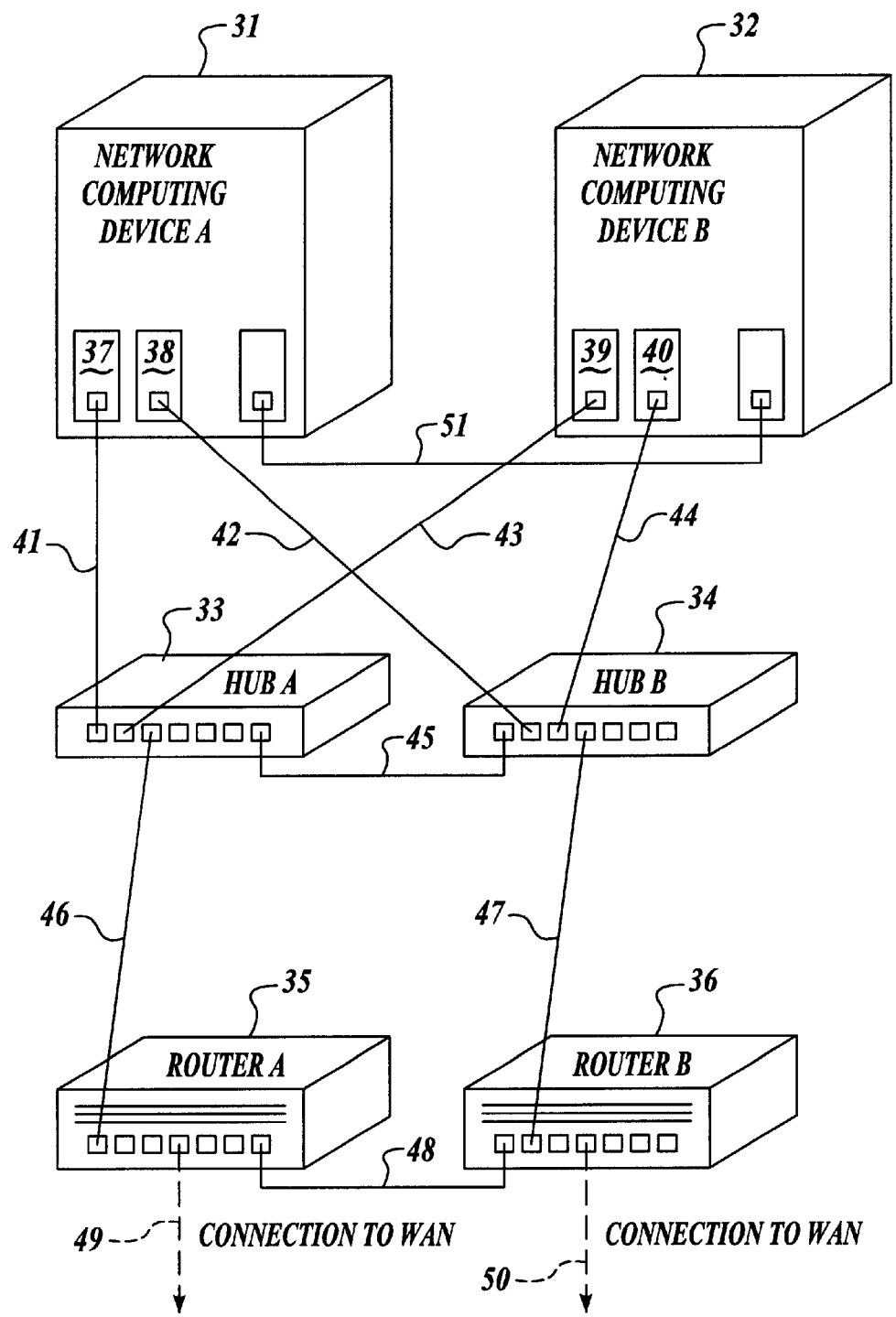
FIG. 3 is an illustration of a network system in which there are redundant network components and redundant computing devices.

FIGS. 2 and 3 illustrate two suitable architectures for the preferred embodiment of the present invention. FIG. 2 depicts a computer network system 28 with redundant network interface connections 25 and 26, but non-redundant computing devices. FIG. 3 depicts a computer network system 30 with a redundant cluster of network computing devices 31 and 32 as well as redundant network interface connections 37–40. Although not shown in FIG. 2 or 3, it can be appreciated that the network computing devices 21, 31 and 32 also include the administrative software to manage and execute the following procedure. It can also be appreciated that the network computing devices 21, 31 and 32 also include a central processing unit, a viewing monitor, keyboard, and various dynamic and static memory devices. Each of these components act in concert to implement the method of the present invention.

In the system depicted in FIG. 2, the present invention allows the network computing device 21 to automatically recover from a network failure when the primary network interface card 25 fails. This invention also allows the network computing device 21 to recover when other connecting network components fail, such as network cable 27 and hub A 22. In the event of a failure, the network computing device 21 automatically changes the data transmission sessions to the second network interface card 26, thereby utilizing the second route of network cable 28 and hub B 23.

In the system depicted in FIG. 3, the present invention allows each network computing device 31 and 32 to automatically recover from a network failure when one or more network interface cards 37–40 fail. For instance, if the first interface card 37 fails, then network computing device A 31 will switch data communications to the second network interface card 38. If the second network interface card 38 fails, then all network tasks of network computing device A will be taken over by network computing device B 32 using its first network interface card 39, and so on. This invention may also apply to systems with more than two redundant network computing devices. If additional network computing devices are added to the network 30, each network computing device would be connected to each hub 33 and 34 in the same manner as the network computing devices 31 and 32 in FIG. 3.

The network 30 may also include an additional interconnection 51 which creates a cluster configuration for a computer local area network. This interconnection 51 may include an ATM, ethernet, FC or other like connections. The interconnection 51 can be used by the network computing devices 31 and 32 to detect a network failure. It may also be used to coordinate general application processes between the computing devices 31 and 32.

The unique feature of these network designs is that each network computing device 21, 31, or 32 has communication connections through redundant network interface cards 25, 26, and 37–40 that operate using the same network stack running on one or more computing devices. In other words, the software on a network computing device that communicates through the network interface cards does not distinguish one interface from another in terms of the internal states of its data communications. For example, the first network interface card 25 can be substituted for the second interface card 26 without disrupting the network stack maintained by the network computing device 21. A network stack is otherwise known as the flow of data packets that are to be communicated with the network. This allows all higher level connections, such as the transport connections, session connections, and application associations to continue operation without interruption.

The first step towards compensating for a fault in a network interface is defining the fault. In this particular application, a fault is defined as an event that causes a network interface to fail to transport a data packet to any network device with which it is connected. This definition assumes that if a network interface can transport a packet to one computing device on the network, it can reach all computing devices. More specifically, if a network device can communicate an IP packet with any one peer on the same IP subnetwork, the network interface card and its connecting cable and hub is considered to be intact. However, it is also considered that if a network device cannot communicate with just one of its peers, the problem may not be with the network itself, the problem may exist with the peer device it cannot contact. Thus, a network interface fault is only assumed if a network device cannot contact any network devices.

Consequently, to determine whether a network interface in question has failed, a network computing device must establish that it cannot communicate with any other device through the network interface card. Since only one other device must be contacted, it is sufficient for the network computing device to successfully contact another device in its local subnet through the interface. Devices that are external to the local subnet must be contacted through a router. So it is sufficient to contact the router itself in order to ensure that the network interface is operating.

Figure 4A:
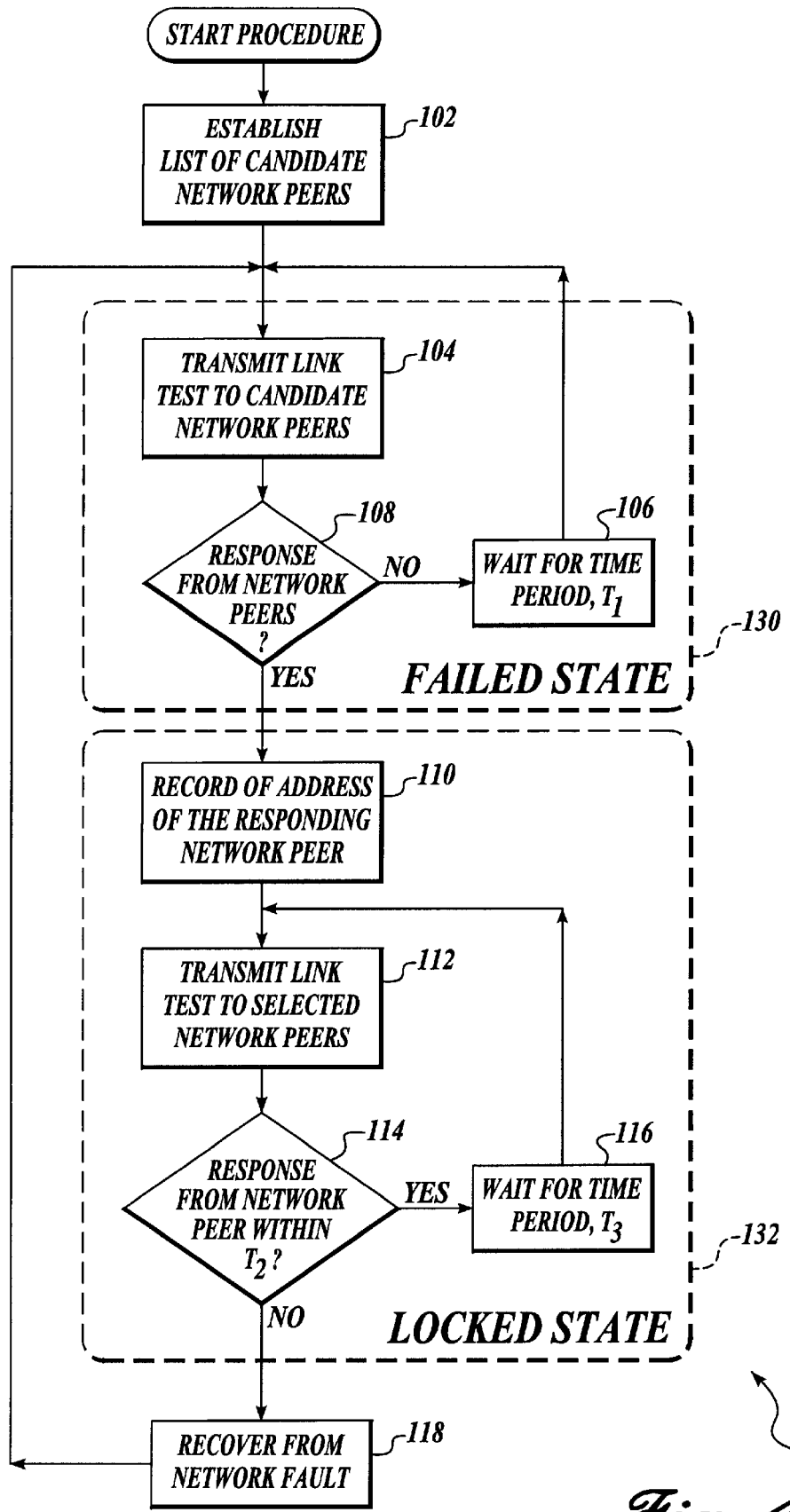
FIG. 4A is a flow diagram of one embodiment of the present invention, summarizing the failure detection and recovery procedures.

FIG. 4A shows the failure detection and recovery method 100 as it is applied to the computer network 28 in FIG. 2. This failure detection process is used simultaneously by each network computing device connected to the computer network 28 using redundant network interface cards. The process basically works by allowing each network computing device to operate in two states, a "locked" state 132 and a "failed" state 130. In the locked state 132, the computing device 21 continuously monitors one portion of the network to make sure the primary network interface card 25 is in operation. In this state, it is assumed that the primary network interface card 25 and all of its connecting components 22 and 27 are in operation. When the network interface card 25 no longer correctly transmits data, the computing device 21 switches to the secondary network interface card 26 and goes into the failed state 130. In the failed state, a search algorithm is used to find another peer network computing device to monitor. Once a peer network computing device is found, the process then goes back into the locked state 132.

The process begins at block 102 where the network computing device 21 establishes a list of potentially addressable network peers on its subnet. This may be accomplished by using several techniques. In one technique, an operator may manually enter one or more specific addresses of peer network computing devices into the memory of the computing device 21. Alternatively, the network computing device 21 may automatically scan the addresses that are within the subnet by using its own address and a subnet mask value. This approach eliminates manual configuration but it is potentially slow if the subnet contains a large number of addresses. In yet another alternative technique, and perhaps a more desirable method for large networks, the network computing device may broadcast a message to all addresses in its subnet requesting every other peer computing device to respond. All devices on the subnet would receive the message and respond to it, thus allowing the network computing device to capture the network address of each peer computing device in the local network. This approach is both fast and automatic, and thus, most desirable for this method.

After establishing an address list of peer computing devices, a communication link test is be executed in block 104. This test is carried out with one or more of the devices according to a specified protocol. As it is undesirable to require all existing network devices to support a new protocol, an existing protocol should be selected. There are three main techniques that could be used to carry out this test: the Internet control message protocol (ICMP), the address resolution protocol (ARP), or the method of attempting to access a TCP or UDP port on another device.

In using the first technique, a network device can test a connection by sending a message using the Internet Control Message Protocol (ICMP), commonly known as a "ping." An ICMP test determines whether a destination is reachable by delivering an error and control messages from the network computing device 21. According to this protocol, specialized IP packets designed for "network housekeeping" tasks are automatically generated and sent by network computing device 21 conducting the test. This is the most desirable protocol to use.

Alternatively, a network device may test a connection by sending a message using Address Resolution Protocol (ARP). ARP is generally used to dynamically discover the low level physical network hardware address that corresponds to the high level IP address for a given host. ARP is limited to physical network systems that support broadcast packets that can be heard by all hosts on the network.

In yet another technique, a network device can attempt to access a resource controlled by the peer device to test the connection. This method attempts to access a TCP or UDP port on another device, which may be denied. When a peer device denies access, or sends a "connection refused" response, the connecting network computing device can assume the ethernet port of the network peer device is in operation.

Returning to FIG. 4A, after the computing device executes the link test, the logic proceeds to block 108 where the network computing device 21 determines if a peer network device has returned a response. If the network computing device 21 does not receive a response, the process continues to block 106 where it executes a wait state for $T_1$ seconds. For block 106, a wait period, $T_1$, of 5 to 10 seconds is sufficient. However, if a peer network device returns a response at block 108, the process continues to block 110 where the network computing device 21 records the IP address of the responding peer computing device in one of its memory devices. In this section of the process, it is only necessary to record the IP address of the first response. However, it may provide additional security if additional IP addresses of other responding peer network computing devices are recorded. At this time, the network computing device may also record the network response time of the link test for each corresponding node. This value may be used for the wait state in block 114, as described below.

In block 112, the network computing device 21 then transmits a link test to one or more of the peer device IP addresses recorded in block 110. In this part of the process, the link test may utilize any one of the three previously mentioned techniques for block 104: the Internet control message protocol (ICMP), the address resolution protocol (ARP), or the method of attempting to access a TCP or UDP port on another device. For block 112, the ICMP is the most desired protocol.

Next, in block 114, the computing device 21 runs a test to determine if at least one peer network computing device has responded within $T_2$ seconds. In this block, $T_2$ may be three times the network response time recorded in block 110. Alternatively, if the process does not dynamically record the network response time of the peer computing device during the execution of block 110, the network response time can be manually tested and entered into the memory of the computing device 21. When the network response time is stored in the memory, the computing device 21 still multiplies this time value by three to determine the wait state, $T_2$, in block 114.

If at least one peer network computing device responds in block 114, the process then proceeds to block 116 where it carries out a wait state of $T_3$ seconds. In this portion of the process, $T_3$ may range from a half second to approximately two seconds. After the wait state in block 116, the process then continues back to block 112 where it executes the link test with the peer computing devices recorded in the memory of the computing device 21. The process then loops through blocks 112 and 116 to continually monitor the network interface card and the connected network components. The loop continues until there is no response from the monitored peer computing device at block 114.

When the network computing device 21 does not receive a response at block 114, the process then renders the network interface card 25 as "failed" and then proceeds to block 118 where it recovers from the failure. The process then proceeds to the failed state in block 104 where it again searches for a peer computing devices on the subnet.

Figure 4B:
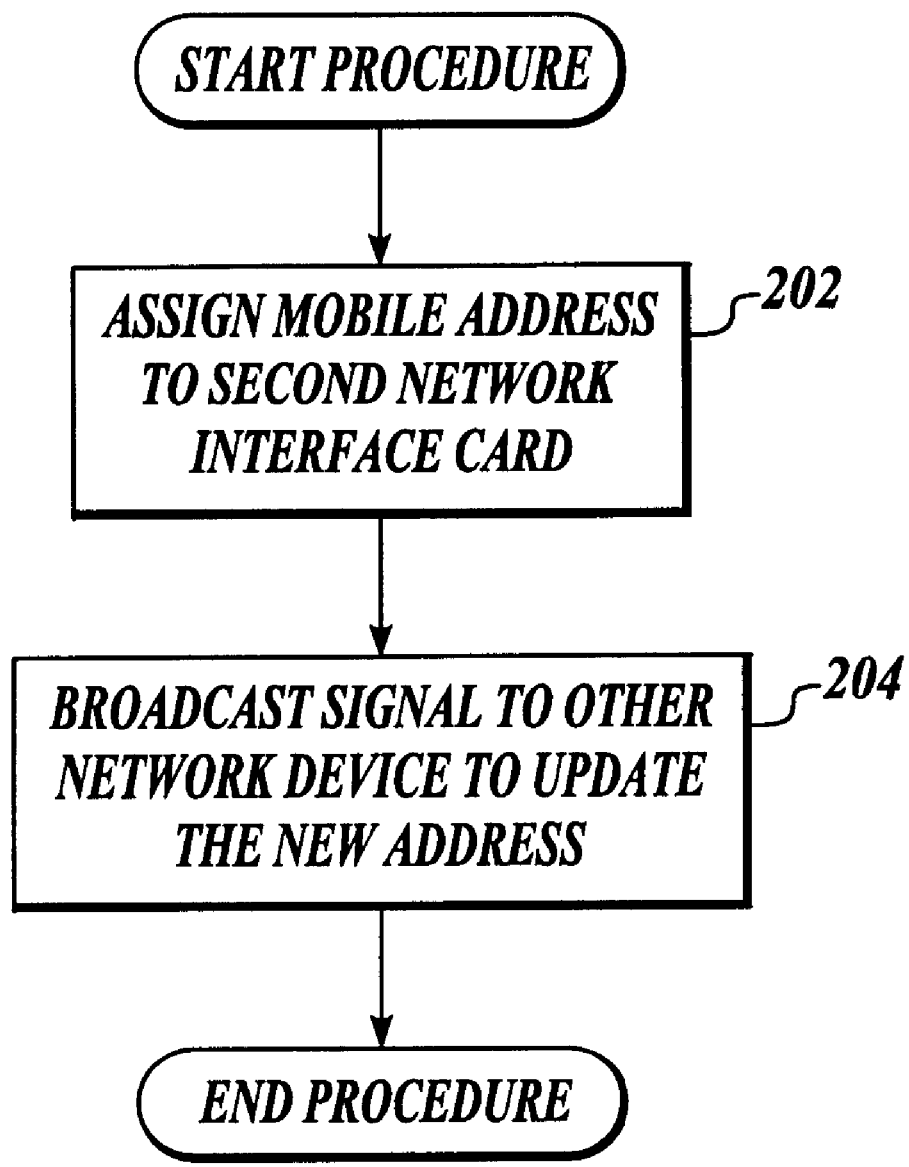
FIG. 4B is a flow diagram of one embodiment of the present invention, summarizing the recovery procedure.

The process of recovering from a network interface failure in block 118 is further illustrated in FIG. 4B. The flow diagram in FIG. 4B applies to the computer network 28 as depicted in FIGS. 2 and 5A–6B. The recovery process basically works by reassigning the IP address associated with the failed network interface card 25 to the redundant network interface card 26. This is done by assigning each network interface card 25 and 26 a fixed IP network address that is used for network management and for performing the link tests. A separate, mobile IP address is also assigned to the operating network interface card 25 or 26 and is used by programs at the application layer to send information through the network interface. The reassignment may be accomplished using three different techniques depending on the architecture of the network.

Figure 5A:
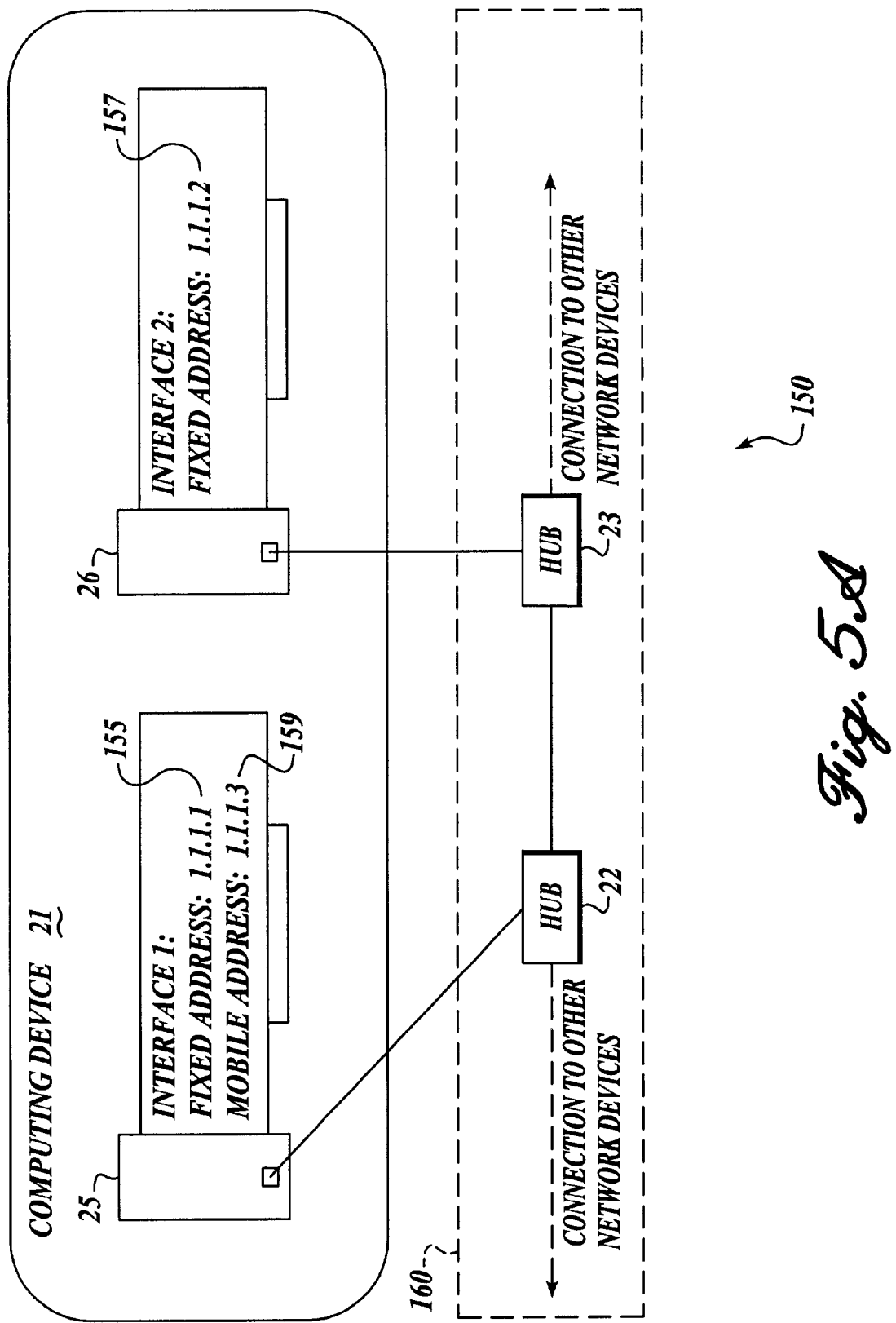
FIG. 5A is a schematic diagram of a network computing device using a primary network interface in accordance with one of the preferred embodiments of the present invention.
Figure 5B:
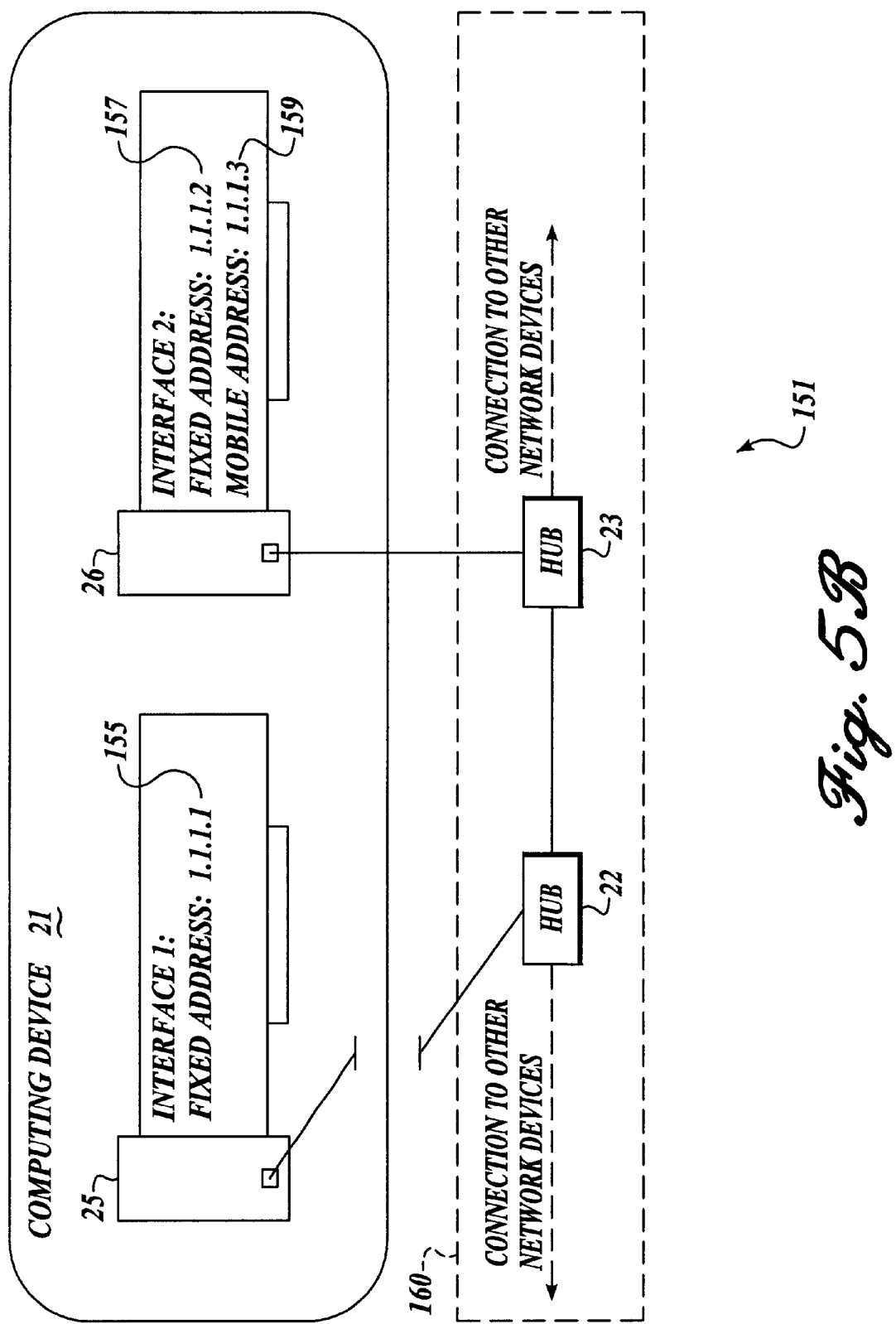
FIG. 5B is a schematic diagram of a network computing device using a secondary network interface in accordance with one of the preferred embodiments of the present invention.

The first recovery technique is based on the network architecture illustrated in FIGS. 5A and 5B. FIG. 5A depicts a computing device 21 in its normal operating state 150 using the first interface 25. FIG. 5B depicts the computing device 21 in its recovered state 151, after a network interface failure, using the secondary interface 26. In this configuration, both the primary and secondary network interface cards 25 and 26 are addressed on the same subnet and connected to the same physical broadcast network 160. In this example, the first interface 25 has a fixed IP address 155 of 1.1.1.1 and the second interface 26 has a fixed IP address 156 of 1.1.1.2. The mobile address 159 is 1.1.1.3, which is assigned to the first interface 25 when both network interface cards 25 and 26 are functioning normally.

In the event that the first interface 51 fails, the process starts at block 202 where the mobile address 159 is reassigned to the second interface card 26. This is a simplified step since the fixed addresses of both network interface cards 25 and 26 are on the same physical broadcast network 160. This step is carried out by the use of network interface card drivers, as commonly known in the art.

Next, in block 204, the external network devices on the same IP subnetwork, such as the routers and other computing devices, are notified of the IP address assignment when the second interface card 26 broadcasts the new IP address. This method in block 204 can be carried out by sending out data packets to all other network computing devices on the subnet to signal each device to update their ARP cache. As known in the art, the ARP cache is a table of MAC address and IP addresses in each network computing device used for packet routing. Once each device has updated the new location of the mobile IP address, all data packets are properly routed to the secondary network interface card 26. As shown in FIG. 5B, the other devices then recognize the new location of the mobile address 159 and correctly route the data packets to the second interface 26.

Figure 6A:
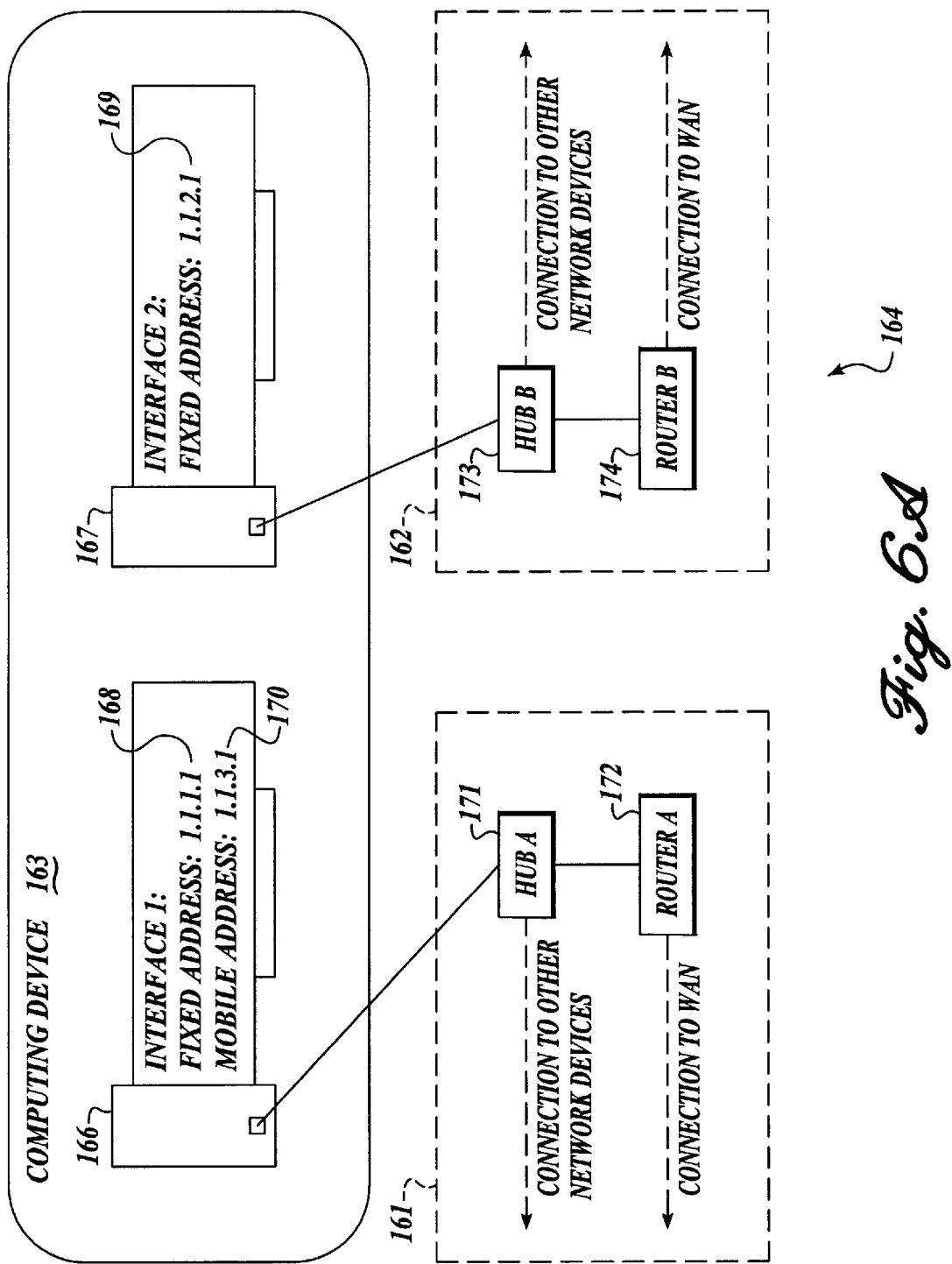
FIG. 6A is a schematic block diagram of a network computing device using a primary network interface in accordance with one of the preferred embodiments of the present invention.
Figure 6B:
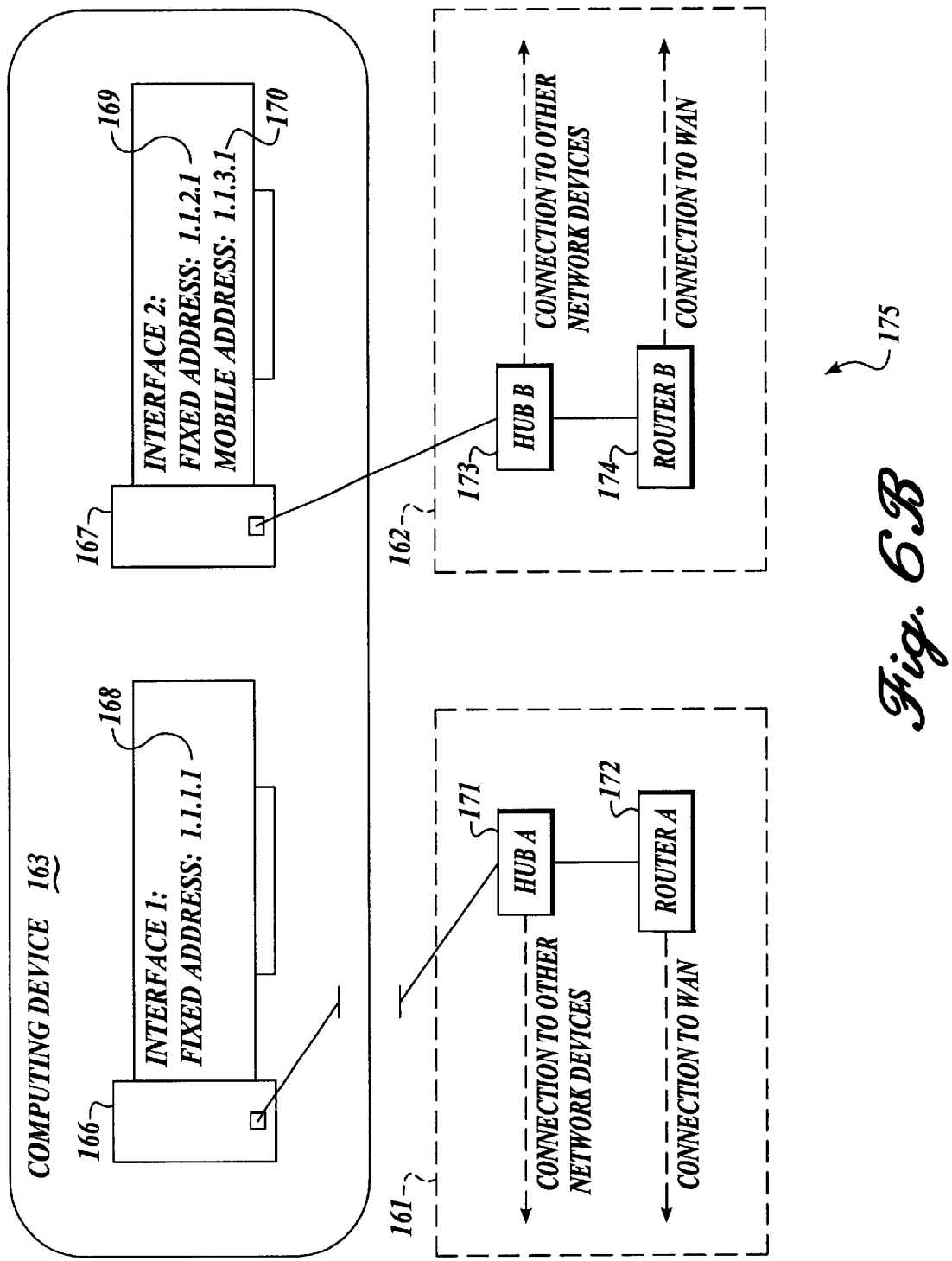
FIG. 6B is a schematic block diagram of a network computing device using a secondary network interface in accordance with one of the preferred embodiments of the present invention.
Figure 7A:
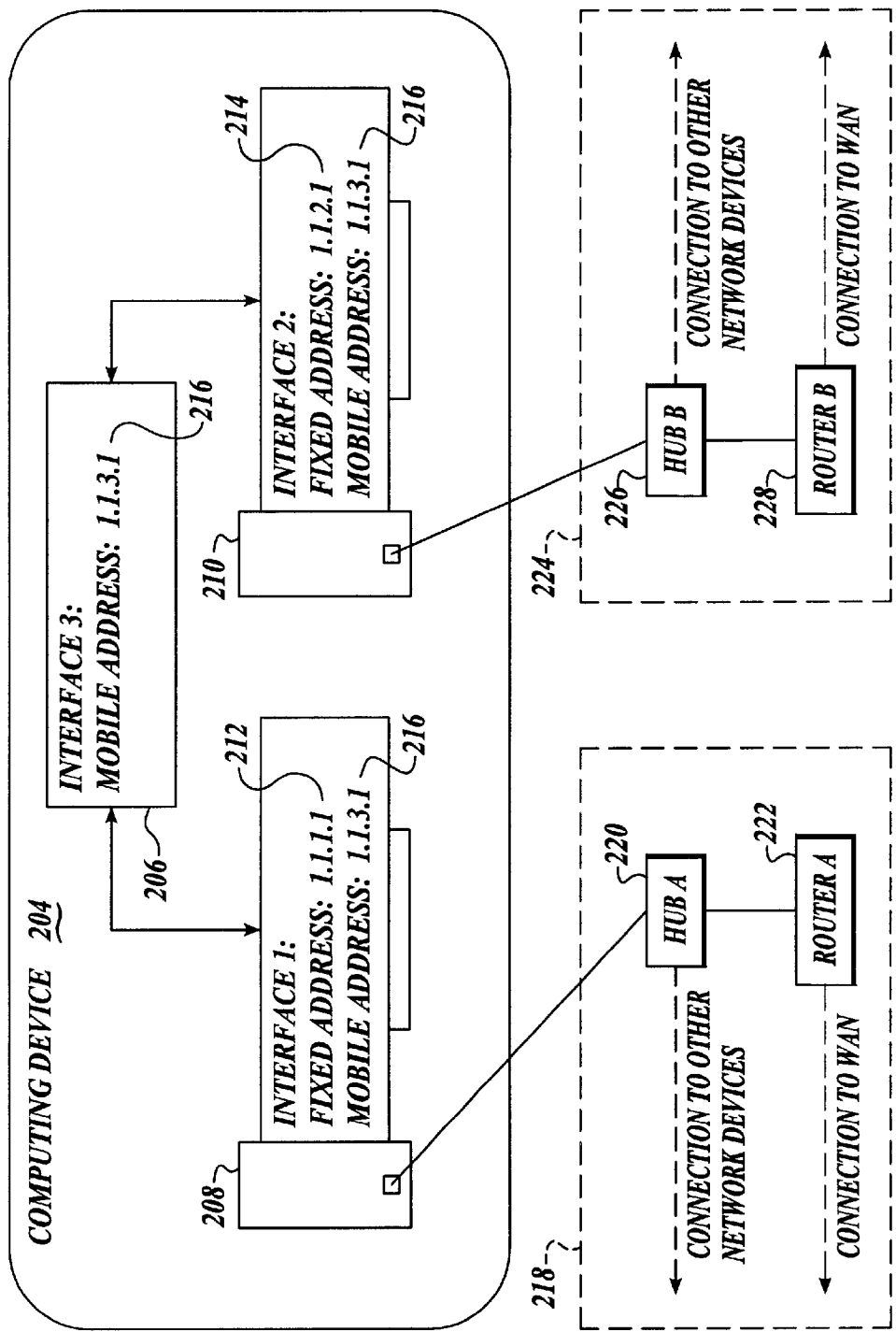
FIG. 7A is a schematic block diagram of a network computing device using a primary and secondary network interface with a loopback interface.
Figure 7B:
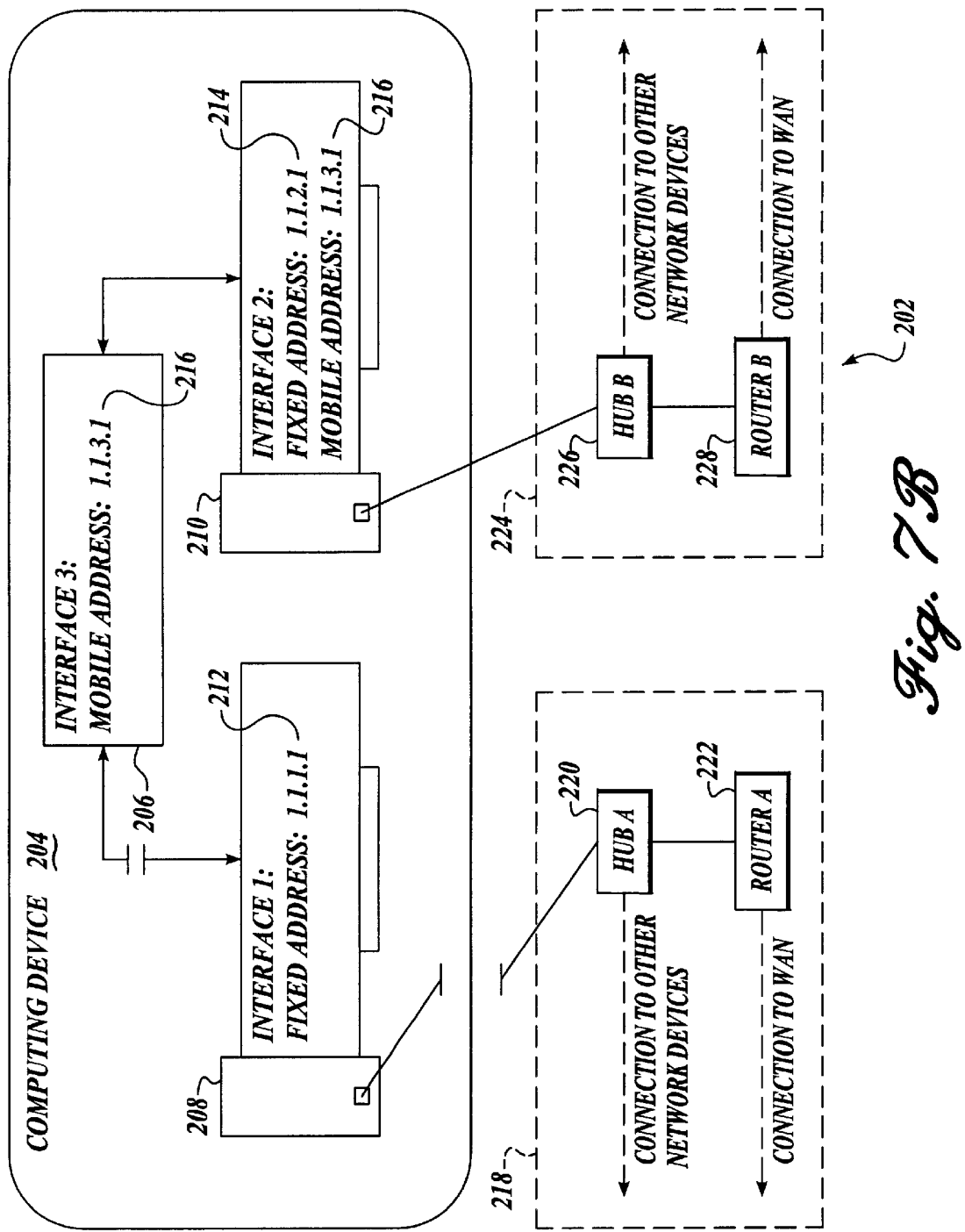
FIG. 7B is a schematic block diagram of a network computing device using a one external network interface with a loopback interface.

The second recovery technique is based on the network architecture illustrated in FIGS. 6A and 6B. FIG. 6A depicts a computing device 163 in its normal operating state 164 using the first interface 166. FIG. 6B depicts the computing device 163 in its recovered state 175, using the secondary interface 167 after a network interface failure. In this configuration, the primary and secondary interface cards 166 and 167 are addressed on separate subnets and connected to a different physical broadcast networks 161 and 162. The first interface 166 has a fixed IP address 168 of 1.1.1.1 and the second interface 167 has a fixed IP address 169 of 1.1.2.1. The mobile address 170 is 1.1.3.1, which is assigned to the first interface 166 when both network interface cards 166 and 167 are functioning normally.

In the event that the first interface 51 fails, the process starts at block 202 where the mobile IP address 159 is simply reassigned to the second interface card 167. As with the network configuration in FIG. 5A, the mobile IP address 159 is moved to the second interface 167 using similarly designed network card drivers.

To accommodate to the network architecture of FIG. 6, block 204 is executed using a slightly different technique. Since the fixed IP addresses 168 and 169 of the first and second network interface 166 and 167 are not on the same physical broadcast network, the external network components used for routing packets through the network must be notified that packets intended for the failed interface card 166 must be rerouted to the second network interface card 167. This is accomplished by using an appropriate routing protocol such as Routing Information Protocol (RIP), RIP Version 2 (RIPv2), or Open Shortest-Path First Interior Gateway Protocol (OSPF).

RIP is a generally known routing protocol for TCP/IP networks. It is a distance-vector routing protocol that measures the shortest distance between the source and destination addresses. It also periodically broadcasts routing tables across the internal network. In this application, RIP is used to distribute routing information to the routers 172 and 174 so that data packets from external networks are properly routed to the secondary network interface 167. RIPv2 is an advancement of RIP in that it is designed to carry more information to the routers and offer additional security features.

OSPF, on the other hand, is a link state routing protocol that may also be used for this application. A link state protocol is a type of routing protocol that includes more analysis in its calculations than the use of the RIP method. For the network configuration in FIG. 6A, RIPv2 is the most desirable protocol for the process in block 204. However, any routing protocol may be used so long as it sufficiently notifies the peer computing devices of each new IP address assignment to each corresponding MAC address.

In the example illustrated in FIG. 6A, router A would advertise the routing addresses for the first network interface card 166 as 1.1.1.0 and 1.1.3.0 during normal operation. At the same time, router B would advertise the corresponding routing address for the second interface card 167 as 1.1.2.0. After the recovery process in blocks 202 and 204 in FIG. 4B, the use of one of the mentioned routing protocols would allow router A to advertise the routing addresses for the first network interface card 166 as: 1.1.1.0 and router B would advertise 1.1.2.0 and 1.1.3.0 for the second interface card 167.

The use of one of these routing protocols allows the secondary interface 167 to notify all other network devices that the mobile address has moved. As a result, routers external to the broadcast network will recognize the change and direct traffic from other subnets to the appropriate subnet (i.e., the subnet servicing the secondary interface 167). After the process in block 204, local traffic coming from the same subnet will be redirected because the routers will use ICMP to route packets to the redundant interface 167.

In sum, both recovery techniques that apply to the computer networks in FIGS. 4B and 5–7 all operate in conjunction with the method in FIG. 4A to efficiently monitor network connections and quickly recover from network failures. These methods are based on redundant network interface cards in one computing device. In addition, this invention also provides a monitoring and recovery process for network connections in multiple computing devices.

As shown in FIG. 3, network computing devices 31 and 32 execute the recovery method much like the network computing device 21 in FIG. 2. Accordingly, the network computing devices 31 and 32 simultaneously follow the process in FIGS. 4A and 4B but the two computers use the additional interconnection 51 to coordinate the multi-computer processes and the monitor and recovery methods described above. In this configuration, there may be more than two network computing devices sharing the same tasks, thus if two network interface cards fail in one machine there is at least one more computing device in operation with at least two redundant network interface cards.

It should be appreciated that neither of these techniques disrupt connections established by network applications or other higher layer connections that may be in use at one time.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a first computing device having a network address and having a primary network interface and a secondary network interface on a network having a plurality of peer computing devices, where an each individual peer computing device of said plurality of peer computing devices has a network address, a method for monitoring a network connection of said primary network interface and recovering from the failure of said primary network interface, the method comprising:

a. establishing a list of network addresses of said individual peer computing device of said plurality of peer computing devices;

b. testing a communication link with at least one said individual peer computing device on said list of network addresses using said primary network interface, wherein said testing of said communication link is executed periodically until at least one said individual peer computing device from said list of network addresses responds;

c. when said individual peer computing device from said list of network addresses responds, thereby creating a responding network computing device, recording said network address of said responding network computing device;

d. retesting said communication link with at least one said responding network computing device;

e. if said responding network computing device responds during said retesting of said communication link, repeating said retesting of said communication link with at least one said responding network computing device; and f. if said responding network computing device does not respond during said retesting of said communication link, reassigning said network address of said first computing device from said primary network interface to said secondary network interface.

2. The method as described in claim 1, further comprising repeating the steps of a through f in additional individual peer computing device on said network.

3. The method as described in claim 1, wherein establishing the address list of network addresses of said plurality of peer computing devices includes manually entering a list of predeterined addresses of said plurality of peer computing devices in said first computing device.

4. The method as described in claim 1, wherein establishing the list of network addresses of said plurality of peer computing devices includes broadcasting a message to each said network address of said plurality of peer computing devices, wherein said first computing device uses a subnet network address to determine a broadcast network address.

5. The method as described in claim 1, wherein testing said communication link includes using an Internet Control Message Protocol.

6. The method as described in claim 1, wherein testing said communication link includes using an Address Resolution Protocol.

7. The method as described in claim 1, wherein testing said communication link includes accessing a resource of one or more peer computing devices.

8. The method as described in claim 1, wherein reassigning said network address of said first computing device includes broadcasting said network address of said first computing device using said secondary network interface to said plurality of peer computing devices.

9. The method as described in claim 1, wherein reassigning said network address of said first computing device comprises appropriating a routing protocol thereby notifying said plurality of peer computing devices that said first computing device is using said secondary network interface.

10. In a first computing device having a network address and having a primary network interface and a secondary network interface connected to a third network interface, wherein said primary network interface and a secondary network interface are connected to a network having a plurality of peer computing devices, and wherein an each individual peer computing device of said plurality of peer computing devices has a network address, a method for monitoring a network connection of said primary network interface and recovering from the failure of said primary network interface, the method comprising:

a. establishing a list of network addresses of said individual peer computing device of said plurality of peer computing devices;

b. testing a communication link with at least one said individual peer computing device on said list of network addresses using said primary network interface, wherein said testing said communication link is executed periodically until at least one said individual peer computing device from said list of network addresses responds;

c. when said individual peer computing device from said list of network addresses responds, thereby creating a responding network computing device, recording said network address of said responding network computing device;

d. retesting said communication link with at least one said responding network computing device using said primary network interface;

e. if said responding network computing device responds during said retesting of said communication link, repeating said retesting of said communication link with at least one said responding network computing device; and f. if said responding network computing device does not respond to said primary network interface during said retesting of said communication link, disconnecting said connection between said primary network interface and said third network interface.

11. The method of claim 10, further comprising repeating the steps of a through f in additional individual peer computing devices on said network.

12. In a first computing device having a network address and having a primary network interface and a secondary network interface connected to a third network interface, wherein said primary network interface and a secondary network interface are connected to a network having a plurality of peer computing devices, and wherein an each individual peer computing device of said plurality of peer computing devices has a network address, a method for monitoring a network connection of said primary network interface and said secondary network interface and recovering from the failure of said primary or secondary network interface, the method comprising:

a. establishing a list of network addresses of said individual peer computing device of said plurality of peer computing devices;

b. testing a communication link with at least one said individual peer computing device on said list of network addresses using said primary network interface, wherein said communication link testing is executed periodically until at least one said individual peer computing device from said list of network addresses responds;

c. when said individual peer computing device from said list of network addresses responds, thereby creating a responding network computing device, recording said network address of said responding network computing device;

d. retesting said communication link with at least one said responding network computing device using said primary network interface and said secondary network interface;

e. if said responding network computing device responds during said retesting of said communication link, repeating said retesting of said communication link with at least one said responding network computing device using said primary network interface and said secondary network interface; and f. if said responding network computing device does not respond to said primary network interface during said retesting of said communication link, disconnecting said connection between said primary network interface and said third network interface;

g. if said responding network computing device does not respond to said secondary network interface during said retesting of said communication link, disconnecting said connection between said secondary network interface and said third network interface.

13. The method of claim 12, further comprising, repeating the steps of a through g in additional individual peer computing devices on said network.

* * * * *